United States Patent Office 2,878,199
Patented Mar. 17, 1959

2,878,199

PHENOL-ALDEHYDE RESINS ESTERIFIED WITH FATTY ACIDS

Robert A. Mohr, St. Paul, Minn., and Erwin L. Capener, China Lake, Calif., assignors to General Mills, Inc., a corporation of Delaware No Drawing. Application May 12, 1955
Serial No. 507,976

8 Claims. (Cl. 260—19)

The present invention relates to a process of preparing phenolic resin esters of higher fatty acids. Recently esters of this type have been prepared for use particularly as protective coatings, waxes, plasticizers and the like. The preferred products are those derived from phenolic resins of a high molecular weight having a high melting point generally over 200° C.

Heretofore the resins used for this purpose have been prepared at elevated temperatures so that a high molecular weight resin is obtained. This resin then is generally stripped of essentially all monomeric materials and lower boiling polymeric materials. To accomplish this stripping the resin is generally heated to temperatures of 250 to 300° C. under a high vacuum (absolute pressure of 2 to 15 mm. of mercury). Considerable difficulties are encountered when it is desired to transfer such a resin to an esterification kettle because of the high melting point of the resin.

Ordinarily the resin is removed in the molten state and allowed to solidify, after which it is broken up. The pieces of resin are then charged to the esterifier by hand and the fatty acids, esterification catalyst and azeotrope added. Thereafter the batch is heated to the temperature desired to bring about esterification (generally about 260° C.). This method entails certain obvious disadvantages such as the high temperature required to maintain the resin in a molten condition during removal from the vessel in which it is made, the contact of the hot resin with atmosphere, and the attendant adverse effect upon the resin and the inconvenience in handling the solid resin.

It has been found, however, that it is possible to add all of the reactants to the reaction vessel at one time and to conduct the resinification reaction in the presence of the fatty acids which subsequently will be used for esterification. Thus, the phenol, formaldehyde, resinification catalyst and the fatty acids can all be charged to the reaction vessel. The reaction vessel is heated up to approximately 160° C., the temperature frequently used in the production of phenolic resins of this type. Under these conditions the phenol and formaldehyde react to form a resin and the fatty acid does not appear to significantly affect the course of the resinification reaction. Upon completion of the resinification reaction an esterification catalyst may be added if one is desired for the esterification and the reaction mixture then heated, first to remove water present and then raised to esterification temperature usually from 200 to 275° C. for a time period sufficient to bring about the desired extent of esterification. It is preferred to employ an azeotrope such as xylene to remove water azeotropically.

It has been found that even under these circumstances where the low molecular weight condensation products have not been removed from the resin before esterification, the esters produced possess essentially the same properties as are produced by preparing the resin separately, stripping it and then esterifying the stripped resin.

It is, therefore, an object of the present invention to provide a novel process of preparing phenolic resin esters of fatty acids in which the phenol, formaldehyde and fatty acids and resinification catalyst are charged to the reaction vessel at one time and the phenolic resin is formed in the presence of the fatty acids which subsequently are used for esterification.

The present invention is applicable to the production of esters derived from phenolic resins in general including resins derived from phenol as well as substituted phenols. Typical substituted phenols include the alkyl substituted phenols in which the alkyl substituent contains from 1–8 carbon atoms, the aryl substituted phenols such as ortho- and para-phenyl phenol and the like. The phenol may contain a single alkyl substituent as in the case of cresol or may contain a plurality of substituents as in the case of xylenol. The phenol should have two reactive positions available such as the two ortho positions or an ortho and the para position. Typical phenols which are suitable for the present purposes include phenol, cresol, xylenol, ethyl-phenol, isopropyl-phenol, p-t-butyl phenol, p-t-amyl phenol, hexyl, heptyl, and octyl phenols, as well as the aryl phenols, ortho- and para-phenyl phenols. The substituents on the phenol may be either straight or branch chain.

In carrying out the reaction the phenol, formaldehyde and an acid resinification catalyst are added to the reaction vessel together with the fatty acid which is to be used for esterification. The quantity of fatty acid which is added depends upon the extent to which it is desired to esterify the phenolic resin. Thus, for coating purposes it is usually desirable to esterify the resin at least 50% by means of fatty acids. Accordingly, sufficient fatty acid to esterify at least 50% of the hydroxyl groups is added at the time that the resin is made. Where substantially complete esterification is desired it is usually desirable to add up to a 25% excess of the fatty acids for the purpose of speeding up the reaction.

When all the reactants have been added to the vessel it is closed and heated to a desirable resinification temperature. This may be either at atmospheric pressure or at super-atmospheric pressure. It has been found desirable to produce the resin at temperatures of approximately 100–160° C., preferably near the top of this range, for time periods varying from ½ to 7 hours. Suitable catalysts for the resinification reaction include oxalic acid and hydrochloric acid. Any other acid resinification catalyst may, however, be substituted.

In order to produce a high molecular weight resin it is usually desirable to avoid having an esterification catalyst present during the resinification reaction and also it is usually desirable to avoid temperatures at which substantial degrees of esterification occur.

When the resinification reaction has been carried on to the desired extent an esterification catalyst is added, if one is to be used, and thereupon the temperature is raised to drive off water of reaction as well as the water associated with formaldehyde in the event that formalin is used. Thereafter the temperature is raised to 200 to 275° C. for esterification. Generally it is preferred to employ an esterification temperature of at least 250° C. Any of the well-known esterification catalysts may be used. However, it is preferred to employ triphenyl phosphite as an esterification catalyst inasmuch as it is found that the reaction proceeds very readily in the presence of this catalyst. The time required for esterification varies widely depending upon the conditions, but in general, from about 2 to about 10 hours is sufficient to effect a desired degree of esterification. Upon completion of the desired degree of esterification any volatile materials such as excess fatty acids may be stripped off by subjecting the reaction mixture to an elevated temperature at a very low pressure, for example 250–300° C. at 1–50 mm. absolute. Other methods of removing excess fatty acids such as solvent extraction with a suitable solvent, may be employed.

While the preferred resin ester products for coating purposes are those derived from unsaturated higher fatty acids, the invention is also applicable to the production of esters of saturated fatty acids, in which event the esters are useful as plasticizers and waxes and the like. Accordingly, the invention is applicable to the esterification of the resins with either saturated or unsaturated higher fatty acids containing from 8–22 carbon atoms. These fatty acids may be single isolated fatty acids or mixtures of the fatty acids derived from non-drying, drying, or semi-drying oils or any selected fraction of the mixed acids of such oils. Typical oils from which the fatty acids may be derived include cottonseed oil, soybean oil, linseed oil, tung oil, perilla oil, oiticia oil, sunflower oil, safflower oil, menhaden oil, tallow and the like. For the preparation of unsaturated esters useful as coatings the fatty acids should have an iodine number of at least 100 and preferably at least 110.

*Example 1*

The following materials were charged to a one-gallon stainless steel autoclave:

|  | G. |
|---|---|
| p-t-Butyl phenol | 600 |
| Formalin, 37% | 330 |
| Oxalic acid | 6 |
| Soybean oil fatty acids | 1400 |

The autoclave was closed and was heated to approximately 160° C. for 5 hours. The autoclave was then cooled, the product removed and the water stripped from it using xylene as an azeotrope. 3.24 g. of triphenyl phosphite were then added and estrification carried out at approximately 260° C. for 6 hours at which time it was substantially completely esterified. The product was then stripped of excess fatty acid and other volatile materials by heating at 280° C. at .3 mm. absolute pressure. Heating was continued at 280 to 290° C. to body the product to a Gardner viscosity of E-F (in a 50% solution in mineral spirits).

*Example 2*

The following materials were charged to a one-gallon stainless steel autoclave and heated with steam to about 160° C. for 5 hours:

|  | G. |
|---|---|
| p-t-Butyl phenol | 600 |
| Formalin, 37% | 348 |
| Soybean oil fatty acids | 1400 |
| Oxalic acid | 6 |

The mixture was then cooled and 500 g. of the mixture was placed in a one-liter, three-necked flash equipped with thermometer, stirrer, and Stark and Dean tube. 50 cc. of xylene was added and the mixture heated to a final temperature of 210° C. to remove water. Thereafter 2.55 g. of triphenyl phosphite was added to the mixture and the temperature raised to 260° C. and esterification was completed. This required approximately 6 hours. Thereupon the reaction mixture was subjected to a temperature of 275° C. at .5 mm. of mercury, absolute pressure, for the purpose of stripping off volatile material. 92 g. of free fatty acids were thus obtained. The Gardner viscosity of a 50% solution in mineral spirits was A+. Thereafter the reaction mixture was bodied by heating for one hour at 280° C. under an absolute pressure of from .3 to .5 mm. 7 g. of additional fatty acids were thus stripped off and the viscosity of a 50% solution in mineral spirits was E–F. The acid number of the product was 4.55. The resin was 82% esterified.

The products of Examples 1 and 2 were compared with a control product which was essentially the same in composition but which was prepared by first preparing the phenolic resin, then adding the fatty acids to the phenolic resin and carrying on the esterification in this way. It will be seen from the tests which follow that the two products of the present invention and the control product were very similar in their properties. Nonetheless the products of the present invention were prepared by a far more convenient method than the control product.

In each instance the product was converted to a 50% solids solution in mineral spirits. Calcium and cobalt naphthenates were added as driers. In each instance 0.1% of calcium and 0.06% of cobalt calculated as metal and based on the solids of the solution were added. The Gardner viscosity was determined on solutions before the addition of the drier and also were determined on the solutions containing the drier after these solutions had stood for 7 days. There was not a significant increase in the viscosity upon the addition of the drier or upon storage of the solution for the period of 7 days.

Films were then cast from the products and the drying times, hardness and alkali resistance determined. The alkali resistance was determined by coating the exterior of the test tubes with the solutions and allowing them to dry. After the films had dried for three days the tubes were immersed in a 5% solution of NaOH in water. For the twist test the tubes were periodically removed from the alkali and twisted in the hands to determine whether or not the film would fail. Other similarly coated tubes were immersed in the alkali and allowed to remain in there until there was visual evidence of failure. The results of these tests are shown in the following table:

| Product | Viscosity | | Drying Time | | Sward Rocker Hardness | | Alkali Resistance 5% NaOH | |
|---|---|---|---|---|---|---|---|---|
|  | No drier | with drier, 7 days | Dustfree, min. | Tackfree, min. | 3 days | 10 days | Twist, hrs. | Visual |
| Ex. 1 | E-F | H | 30 | 290 | 21 | 21 | 8 | Yellow 264 hrs. |
| Ex. 2 | E-F | E-F | 35 | 390 | 22 | 24 | 8 | O. K. 264 hrs.; sl. yellow 336 hrs. |
| Control | B-C | B-C | 60 | 480 | 20 | 22 | 8 | V. sl. yellow 336 hrs. |

As will be seen from the table the products of Examples 1 and 2 have slightly higher viscosities than did the control product which accounts for the slightly better drying time. The hardness values are essentially the same in all cases and the alkali resistance is of the same order of magnitude, the control example showing a slight superiority in this regard.

*Example 3*

The following materials were charged to a one-gallon stainless steel autoclave:

| | G. |
|---|---|
| p-t-Butyl phenol | 600 |
| Soybean oil fatty acids | 840 |
| Formalin, 37% | 348 |
| Oxalic acid | 6 |

The autoclave was heated to approximately 160° C. for approximately 5 hours. 500 g. of the product and 50 cc. of xylene were added to a one-liter flask equipped with a thermometer, stirrer and Stark and Dean tube. The reaction mixture was heated to 232° C. over a period of approximately one hour to remove the water. Then 4 g. of triphenyl phosphite were added and the reaction mixture heated to approximately 260° C. for approximately four hours. The reaction mixture was then placed under a vacuum and the temperature raised to approximately 285° C. at approximately .5 mm. absolute pressure. The product had an acid number of approximately 12.0 and a hydroxyl number of 53.1 and was approximately 68% esterified by the soybean oil fatty acids. A sample was used to prepare a 50% solution in mineral spirits; the solution having a viscosity of F–G.

*Example 4*

A resin ester was prepared under the conditions previously set forth, from the following ingredients:

| | G. |
|---|---|
| Ortho phenylphenol | 681 |
| Formalin, 37% | 348 |
| Oxalic acid | 6.8 |
| Soybean oil fatty acids | 1400 |

The resin was substantially completely esterified in a period of four hours and then bodied for eight hours to produce an ester which had a viscosity of B in a 50% solution in mineral spirits. The acid number was 7.

*Example 5*

A resin ester was prepared as described previously, from the following ingredients:

| | G. |
|---|---|
| Octyl phenol | 824 |
| Formalin, 37% | 348 |
| Oxalic acid | 8.2 |
| Soybean oil fatty acids | 1400 |

The resin was substantially completely esterified in 7½ hours and then bodied for 1 hour to yield an ester having a viscosity in a 50% solution in mineral spirits of D–E and an acid number of 7.

*Example 6*

A resin ester was prepared as described previously, from the following ingredients:

| | G. |
|---|---|
| p-t-Butyl phenol | 600 |
| Formalin, 37% | 348 |
| Oxalic acid | 6 |
| Soybean oil fatty acids | 1064 |
| Rosin acids | 358 |

The resin was substantially completely esterified in 5.5 hours and then bodied for 3.25 hours to yield a resin ester having a viscosity in a 50% solution in mineral spirits of M and an acid number of 6.

The products of Examples 3, 4, 5 and 6 were tested in the manner referred to with reference to Examples 1 and 2 and the results are indicated in the following table. For purposes of comparison in some instances a control sample has been included, the control sample having been prepared from the same ingredients in the same proportions but in which the resin was prepared separately before esterification.

| Sample No. | Drying times in minutes | | Sward Rocker Hardness, 3 days | Alkali Resistance 5% NaOH, Twist |
|---|---|---|---|---|
| | Dust Free | Tack Free to Foil | | |
| Ex. 3 | <60 | >480 <660 | 32 | Fail 6 hrs. |
| Control 3 | <60 | >480 <660 | 31 | Fail between 7-21 hrs. |
| Ex. 4 | <60 | >480 <660 | 19 | Fail 5 hrs. |
| Ex. 5 | <60 | >480 <660 | 13 | Fail 4 hrs. |
| Ex. 6 | <60 | 300 | 41 | Fail between 7-21 hrs. |
| Control 6 | <60 | 360 | 35 | Do. |

As is shown in the table the products prepared according to the present invention had properties very similar to those obtained by the more cumbersome method heretofore employed.

The examples were conducted partially on the laboratory scale and for this purpose a sample of the reaction mixture was transferred to an esterification flask. In commercial practice the reaction mixture after the resinification reaction would be merely heated to an esterification temperature and the reaction conducted in the same vessel in which the resinification reaction was carried on. It will be apparent, moreover, that numerous other variations are possible within the scope of the invention.

Now, therefore, we claim:

1. Process of producing a higher fatty acid ester of a phenolic resin which comprises reacting a phenol selected from the group consisting of phenyl phenols and alkyl phenols containing from 1–8 carbon atoms in the alkyl substituent, and formaldehyde in about equimolar proportions and in the presence of a higher fatty acid in the presence of an acid resinification catalyst and at a temperature below 200° C. to produce a phenolic resin and subsequently heating the phenolic resin thus obtained with the higher fatty acid present during the resinification reaction to a temperature above 200° C. to effect esterification of the phenolic resin.

2. Process according to claim 1 in which the higher fatty acid is an unsaturated higher fatty acid.

3. Process of producing a phenolic resin ester of a higher fatty acid which comprises charging a phenol selected from the group consisting of phenyl phenols and alkyl phenols containing from 1–8 carbon atoms in the alkyl substituent, formaldehyde, a higher fatty acid and an acid resinification catalyst into an autoclave, heating the reaction mixture to a temperature of approximately 100 to 160° C. to form a phenolic resin in the presence of the higher fatty acid, thereafter adding an esterification catalyst and heating the reaction mixture to a temperature within the approximate range of 200 to 275° C. to esterify the phenolic resin with the fatty acid.

4. Process according to claim 3 in which the fatty acids are of an oil having at least semi-drying properties.

5. Process according to claim 3 in which the phenolic resin is esterified at least 50% by means of the higher fatty acids.

6. Process according to claim 3 in which the phenolic resin ester thus obtained is subjected to a stripping process for the removal of volatile materials.

7. Process according to claim 3 in which the phenol is p-t-butyl phenol.

8. Process according to claim 1 in which the phenol is p-t-butyl phenol.

References Cited in the file of this patent

UNITED STATES PATENTS

| | | |
|---|---|---|
| 1,102,473 | Chappell | July 7, 1914 |
| 2,506,903 | Smith et al. | May 9, 1950 |
| 2,506,904 | Smith et al. | May 9, 1950 |
| 2,649,422 | Aelony | Aug. 18, 1953 |

OTHER REFERENCES

Martin: The Chemistry of Phenolic Resin, pages 207–214, John Wiley (1956).